United States Patent

Sweet et al.

[15] 3,698,743
[45] Oct. 17, 1972

[54] COMBUSTION LINER JOINT

[72] Inventors: Ervin J. Sweet, Trumbull; Brian W. Doyle, Shelton; Joseph Rygelis, Monroe, all of Conn.

[73] Assignee: Avco Corporation, Stratford, Conn.

[22] Filed: Jan. 28, 1971

[21] Appl. No.: 110,448

[52] U.S. Cl. ...................... 285/41, 285/81, 285/187
[51] Int. Cl. .............................................. F16l 53/00
[58] Field of Search ........ 285/13, 14, 41, 81, 87, 153, 285/154, 187, 305, 307, 319, 321

[56] References Cited

UNITED STATES PATENTS

| | | | |
|---|---|---|---|
| 2,337,038 | 12/1943 | Fentress | 285/41 |
| 2,468,847 | 5/1949 | Trainor | 285/319 X |
| 2,509,503 | 5/1950 | Huyton | 285/187 X |
| 1,967,297 | 7/1934 | Down | 285/14 |
| 2,108,265 | 2/1938 | Martin et al. | 285/305 X |
| 2,494,659 | 1/1950 | Huyton | 285/41 |
| 3,315,990 | 4/1967 | Kramer | 285/321 X |
| 3,027,179 | 3/1962 | Wiltse | 285/321 |

Primary Examiner—David J. Williamowsky
Assistant Examiner—David H. Corbin
Attorney—Charles M. Hogan and Irwin P. Garfinkle

[57] ABSTRACT

A combustion chamber liner is comprised of two telescoping sections, the leading edge of the downstream section overlapping the trailing edge of the upstream section. The end of the downstream section is provided with a plurality of peripherally spaced inwardly directed bosses. The inner peripheral surface of each of the bosses is grooved to accept a metal ring. The end of the upstream section is provided with a peripherally stepped surface having a supplemental groove, one end of which is open. The open end is closed by a spring snap ring which permits a sliding motion in only one direction. The two telescoping sections are joined by seating the ring in the groove in the downstream bosses and sliding the assembly over the snap ring, which prevents further movement between the sections. When cool, the dimensions of the upstream and downstream sections are such that there is a loose connection between the sections. However, the upstream section is subjected to more heat than the downstream section, causing it to expand to provide a tight fit.

5 Claims, 3 Drawing Figures

PATENTED OCT 17 1972　　　　　　　　　　　　　　　3,698,743

INVENTORS.
ERVIN J. SWEET
BRIAN W. DOYLE
JOSEPH RYGELIS
BY
ATTORNEYS.

COMBUSTION LINER JOINT

BACKGROUND OF THE INVENTION

The combustor for the conventional gas turbine engine is often made of telescoped generally cylindrical combustor sections. A common method for manufacturing these combustors is to telescope a number of sections and spotweld them together at circumferentially spaced points along their overlapping edges. The assembly of such telescoping sections is often difficult and frequently requires complex joints for providing a firm construction while at the same time admitting cooling air. Moreover, the telescoping sections are subjected to different temperatures, and hence the stresses introduced by relative expansion of the sections can cause fatigue leading to premature failure of the metals.

This invention provides a simple and efficient means for supporting the telescoping sections of the combustor while at the same time permitting expansion of the combustor sections. Briefly stated, the overlapping sections of the combustor are interconnected by means of a ring seated between opposing grooves in the overlapped sections. One of the grooves is closed at one side only by means of a peripheral one-way snap ring. The grooves in one of the sections are located in peripherally spaced bosses, the spacing between the bosses providing for the admission of coolant air into the combustor chamber. The dimensions of the overlapping sections are chose so that the fit between the sections is loose when cool. When heated, the upstream section is subjected to greater heat and its expansion with respect to the downstream section produces a rigid fit without introducing stresses sufficient to cause fatigue in the metals.

THE DRAWINGS

DESCRIPTION OF THE ILLUSTRATED EMBODIMENT

Figure 1:
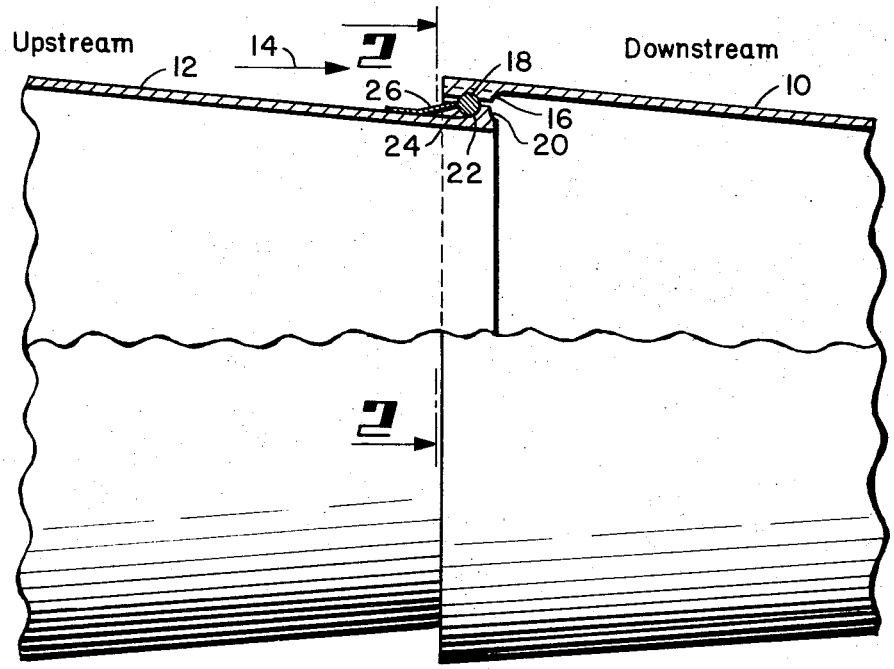
Fig. 1 is an axial cross section of a combustor liner assembled in accordance with this invention.
Figure 3:
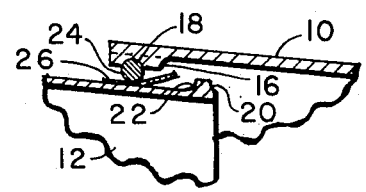
Fig. 3 is an enlargement showing the detail of the bosses and ring.
Figure 2:
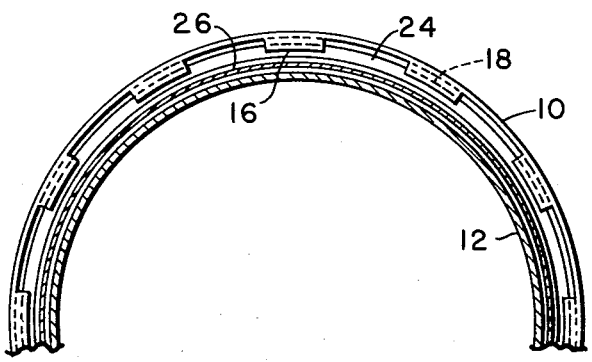
Fig. 2 is a section taken through the line 2—2 in FIG. 1.

Fig. 7 shows two telescoped sections 10 and 12 of a combustor suitable for use in a gas turbine engine. While only two sections are shown, it will be understood that the combustor may comprise several additional sections and that the sections may, in practice, have other configurations; that is to say, the walls may have more complex shapes, may include perforations for the admission of cooling air, and may be grooved in the direction of gas flow.

Compressed air is delivered to the combustor from a compressor (not shown) in the direction of the arrow 14. The trailing edge of the downstream outer section 10 is provided with a plurality of peripherally spaced bases 16, all of which have peripherally aligned grooves 18. Cooling air is admitted to the combustor through the spaces between the bosses 18.

The end of the inner upstream section 12 is provided with a contoured step 20 providing a half groove 22 positioned opposite the groove 18. A ring 24 has a configuration which is generally complementary to the composite groove formed by the grooves 18 and 22, except that the composite is open at one side. To close the opening of the groove 22, a peripheral slotted spring snap ring 26 is affixed to the section 12. The snap ring 26 is inclined in the direction of the groove and positioned adjacent thereto so that the ring 24, when seated in the groove 18, can be pushed past it and into the groove 22. However, the snap spring 26 does not permit withdrawal of the ring, and thus, the sections are securely locked.

The dimensions of the bosses 16 and the step 20 and their associated grooves are selected so that there is a loose fit between the sections when snapped together in a cold condition. Because of the direction of flow of the cooling air, the upstream section is subjected to more heat than the downstream section, and therefore, the upstream section expands more than the downstream section. If the dimensions have been properly selected, a tight fit results when fully heated to operating temperature. While the illustrated embodiment is constructed so that the snap ring 26 is mounted on the upstream section 12 and the bosses 16 are located on the downstream section 10, these parts may be reversed. In either case, the area of the combustor between the overlapping sections and immediately downstream of the bosses provides an expansion area for the compressed air. This tends to improve the performance of the combustor and is one of the advantages of the invention.

CONCLUSION

In summary, Applicants have devised a joint which is simple in construction and assembly for securing the overlapping telescoped sections of a combustion chamber. In operation the joint is rigid, it produces no excessive stresses on the metals, and at the same time it permits the in-flow of cooling air to the combustion chamber.

What is claimed is:

1. A combustor having upstream and downstream radially spaced telescoping sections, an end of said downstream section overlapping an end of said upstream section, the outer surface of the end of the upstream section being surrounded by the inner surface of the end of the downstream section;

a plurality of peripherally spaced bosses on one of said surfaces, the spacing between said bosses providing means for admitting cooling air from outside the combustor to the inside thereof, the direction of flow being from the upstream section to the downstream section;

a groove in each of said bosses, said grooves being peripherally aligned;

a step on said other surface, said step having a groove open at one said, said groove opposing said peripherally aligned grooves;

a lock ring seated in said peripherally aligned grooves and said groove on said step for connecting said sections;

and a one-way spring snap ring affixed to the periphery of the surface of said section carrying said step and adjacent the open side of said groove on said step, said one-way snap ring preventing the removal of said ring through said open side.

2. The invention as defined in claim 1 wherein said spring snap ring is inclined toward said opening and depressible to permit the passage of said lock ring in only one direction.

3. The invention as defined in claim 1 wherein said bosses are on said inner surface of said downstream section, and said step is on said outer surface of said upstream section.

4. The invention as defined in claim 1 wherein said locking ring is dimensioned to fit loosely in said grooves without sufficient clearance to permit separation of the sections under normal cool non-operating conditions, said fit becoming tight under normal hot operating conditions due to the difference in expansion of said sections.

5. The invention as defined in claim 1 wherein said telescoping sections form an expansion area immediately downstream of said bosses.

* * * * *

PO-1050
(5/69)

UNITED STATES PATENT OFFICE
CERTIFICATE OF CORRECTION

Patent No. 3,698,743      Dated October 17, 1972

Inventor(s) Ervin J. Sweet, Brian W. Doyle, Joseph Rygelis

It is certified that error appears in the above-identified patent and that said Letters Patent are hereby corrected as shown below:

Column 1, line 31, "chose" should read --- chosen ---.

Column 1, line 49, "Fig. 7" should read --- Fig. 1 ---.

Column 1, line 62, "bases" should read --- bosses ---.

Column 2, line 58, "said" should read --- side ---.
          (first occurrence)

Signed and sealed this 29th day of May 1973.

(SEAL)
Attest:

EDWARD M. FLETCHER, JR.
Attesting Officer

ROBERT GOTTSCHALK
Commissioner of Patents